(12) United States Patent
Schmutzer et al.

(10) Patent No.: US 12,531,776 B2
(45) Date of Patent: Jan. 20, 2026

(54) EXTENDING ACTIVE MEASUREMENT PROTOCOL WITH OAM CHANNEL

(71) Applicant: Cisco Technology, Inc., San Jose, CA (US)

(72) Inventors: Christian Schmutzer, Weinviertel (AT); Patrice Brissette, Gatineau (CA); Rakesh Gandhi, Stittsville (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 615 days.

(21) Appl. No.: 17/865,952

(22) Filed: Jul. 15, 2022

(65) Prior Publication Data
US 2024/0022467 A1    Jan. 18, 2024

(51) Int. Cl.
*H04L 41/0654* (2022.01)
*H04L 43/0823* (2022.01)

(52) U.S. Cl.
CPC ...... *H04L 41/0654* (2013.01); *H04L 43/0823* (2013.01)

(58) Field of Classification Search
CPC .................................................. H04L 41/0654
See application file for complete search history.

(56) References Cited

U.S. PATENT DOCUMENTS

| | | | | |
|---|---|---|---|---|
| 8,526,313 B1 * | 9/2013 | Jones | ...................... | H04L 43/10 370/249 |
| 8,553,568 B2 * | 10/2013 | Allan | ...................... | H04L 43/10 370/242 |
| 8,559,432 B2 * | 10/2013 | Kini | ...................... | H04L 45/304 370/392 |
| 9,391,833 B2 * | 7/2016 | Krzanowski | ........ | H04L 41/0226 |
| 10,193,765 B2 * | 1/2019 | Holness | ................ | H04L 49/555 |
| 2008/0273467 A1 * | 11/2008 | Zhang | ................. | H04L 43/0817 370/241.1 |
| 2008/0285466 A1 * | 11/2008 | Salam | ................. | H04L 41/0226 370/242 |
| 2009/0168783 A1 * | 7/2009 | Mohan | .................... | H04L 45/74 370/395.5 |
| 2009/0175278 A1 * | 7/2009 | Harel | ................... | H04L 12/4633 370/389 |

(Continued)

FOREIGN PATENT DOCUMENTS

WO    2022/033034 A1    2/2022

OTHER PUBLICATIONS

Gandhi, et al., "Encapsulation of Simple TWAMP (STAMP) for Pseudowires in MPLS Networks," draft-gandhi-mpls-stamp-pw-01, IETF, MPLS Working Group, Internet-Draft, Standards Track, Jan. 14, 2022, 14 pages.

(Continued)

*Primary Examiner* — Guang W Li
(74) *Attorney, Agent, or Firm* — Edell, Shapiro & Finnan, LLC

(57) ABSTRACT

In one example, techniques are provided for extending an active measurement protocol with an Operations, Administration and Management/Maintenance (OAM) channel. A first Provider Edge (PE) node obtains from or provides to a second PE node, over a packet-switched network via an overlay, OAM data in an OAM channel of the active measurement protocol. The OAM data relates to a networking issue. The network issue is automatically resolved responsive to the OAM data.

20 Claims, 13 Drawing Sheets

(56) References Cited

U.S. PATENT DOCUMENTS

| | | | | |
|---|---|---|---|---|
| 2010/0208582 | A1* | 8/2010 | Poulin | H04L 45/586 370/503 |
| 2013/0148494 | A1* | 6/2013 | Abbas | H04L 45/125 370/225 |
| 2013/0259056 | A1* | 10/2013 | Kotrabasappa | H04L 45/28 370/389 |
| 2015/0019713 | A1* | 1/2015 | Bugenhagen | G06F 11/3006 709/224 |
| 2015/0043330 | A1* | 2/2015 | Hu | H04L 49/557 370/225 |
| 2015/0110120 | A1* | 4/2015 | Mohan | H04L 12/4633 370/401 |
| 2015/0124626 | A1* | 5/2015 | Sul | H04L 47/825 370/241.1 |
| 2016/0048403 | A1* | 2/2016 | Bugenhagen | G06F 9/45558 718/1 |
| 2016/0301571 | A1* | 10/2016 | Wang | H04L 41/0893 |
| 2017/0104660 | A1* | 4/2017 | Wexler | H04L 43/14 |
| 2018/0351686 | A1* | 12/2018 | Busi | H04J 3/1652 |
| 2020/0028761 | A1* | 1/2020 | Holness | H04L 47/125 |
| 2021/0243053 | A1* | 8/2021 | Dunbar | H04L 12/4633 |
| 2022/0210038 | A1* | 6/2022 | Pueblas | H04L 43/20 |
| 2022/0321451 | A1* | 10/2022 | Brissette | H04L 45/04 |
| 2022/0407802 | A1* | 12/2022 | Xiao | H04L 45/50 |
| 2023/0021278 | A1* | 1/2023 | Filsfils | H04L 45/28 |
| 2023/0268982 | A1* | 8/2023 | Li | H04B 7/15507 370/315 |
| 2023/0318970 | A1* | 10/2023 | Yang | H04L 45/741 |

OTHER PUBLICATIONS

Gandhi, et al., "Simple TWAMP (STAMP) Extensions for Segment Routing Networks," draft-ietf-ippm-stamp-srpm-03, IETF, IPPM Working Group, Internet-Draft, Standards Track, Feb. 2, 2022, 16 pages.

Gringeri, et al., "Private Line Emulation over Packet Switched Networks," draft-schmutzer-pals-ple-00, Internet Engineering Task Force, Internet-Draft, Standards Track, Feb. 22, 2022, 21 pages.

Bryant, et al., "Pseudowire Emulation Edge-to-Edge (PWE3) Control Word for Use over an MPLS PSN," The Internet Society, Network Working Group, Request for Comments: 4385, Standards Track, Feb. 2006, 12 pages.

Vainshtein, et al., "Structure-Agnostic Time Division Multiplexing (TDM) over Packet (SAToP)," The Internet Society, Network Working Group, Request for Comments: 4553, Standards Track, Jun. 2006, 27 pages.

Malis, et al., "Synchronous Optical Network/Synchronous Digital Hierarchy (SONET/SDH) Circuit Emulation over Packet (CEP)," The IETF Trust, Network Working Group, Request for Comments: 4842, Standards Track, Apr. 2007, 43 pages.

Lang, et al., "RSVP-TE Extensions in Support of End-to-End Generalized Multi-Protocol Label Switching (GMPLS) Recovery," The IETF Trust, Network Working Group, Request for Comments: 4872, Standards Track, May 2007, 47 bages.

Stein, et al., "Time Division Multiplexing over IP (TDMoIP)," The IETF Trust, Network Working Group, Request for Comments: 5087, Informational, Dec. 2007, 50 pages.

Weingarten, et al., "MPLS Transport Profile (MPLS-TP) Linear Protection," Internet Engineering Task Force (IETF), Request for Comments: 6378, Standards Track, Oct. 2011, 45 pages.

Mirsky, et al., "Simple Two-Way Active Measurement Protocol," Internet Engineering Task Force (IETF), RFC: 8762, Standards Track, Mar. 2020, 15 pages.

Telecommunication Standardization Sector of ITU "Network node interface for the synchronous digital hierarchy (SDH), "ITU-T Recommendation G.707/Y.1322, https://www.itu.int/rec/dologin_pub.asp?lang=e&id=T-REC-G.707-200701-I!!PDF-E&type=items, Jan. 2007, 196 pages.

Telecommunication Standardization Sector of ITU, "Interfaces for the optical transport network Corrigendum 1," Recommendation ITU-T G.709/Y.1331 (2020)—Corrigendum 1, G.709 : Interfaces for the optical transport network: Corrigendum 1 (itu.int), May 2021, 288 pages.

Telecommunication Standardization Sector of ITU, "Characteristics of synchronous digital hierarchy (SDH) equipment functional blocks," ITU-T Recommendation G.783, https://www.itu.int/rec/dologin_pub.asp?lang=e&id=T-REC-G.783-200603-I!!PDF-E&type=items, Mar. 2006, 288 pages.

Telecommunication Standardization Sector of ITU, "Characteristics of synchronous digital hierarchy (SDH) equipment functional blocks—Amendment 1," Recommendation ITU-T G.783 (2006)—Amendment 1, https://www.itu.int/rec/T-REC-G.783-200805-I!Amd1/en, May 2008, 14 pages.

Telecommunication Standardization Sector of ITU, "Ethernet linear protection switching - Amendment 1," Recommendation ITU-T G.8031/Y.1342 (2015)—Amendment 1, https://www.itu.int/rec/dologin_pub.asp?lang=f&id=T-REC-G.8031-201501-I!!PDF-E&type=items, Mar. 2018, 98 pages.

Telecommunication Standardization Sector of ITU, "Linear protection switching for MPLS transport Profile—Amendment 3," Recommendation ITU-T G.8131/Y.1382 (2014)—Amendment 3, https://www.itu.int/rec/T-REC-G.8131-201811-I!Amd3, Nov. 2018, 38 pages.

Telecommunication Standardization Sector of ITU, "Types and characteristics of SDH network protection architectures," ITU-T Recommendation G.841, https://www.itu.int/rec/T-REC-G.841/en, Oct. 1998, 141 pages.

Telecommunication Standardization Sector of ITU, Optical transport network: Linear protection—Corrigendum 1, Recommendation ITU-T G.873.1 (2017)—Corrigendum 1, Mar. 2020, https://www.itu.int/rec/T-REC-G.873.1-202003-I!Cor1, Mar. 2020, 40 pages.

Aissaoui, et al., "Pseudowire (PW) Operations, Administration, and Maintenance (OAM) Message Mapping," Internet Engineering Task Force (IETF), Request for Comments: 6310, Standards Track, Jul. 2011, 40 pages.

* cited by examiner

1300

AT A FIRST PROVIDER EDGE NODE, OBTAIN FROM OR PROVIDE TO A SECOND PROVIDER EDGE NODE OVER A PACKET-SWITCHED NETWORK VIA AN OVERLAY, OPERATIONS, ADMINISTRATION AND MANAGEMENT/MAINTENANCE (OAM) DATA IN AN OAM CHANNEL OF AN ACTIVE MEASUREMENT PROTOCOL, WHEREIN THE OAM DATA RELATES TO A NETWORKING ISSUE — 1310

RESPONSIVE TO THE OAM DATA, AUTOMATICALLY RESOLVE THE NETWORKING ISSUE — 1320

FIG.13

EXTENDING ACTIVE MEASUREMENT PROTOCOL WITH OAM CHANNEL

TECHNICAL FIELD

The present disclosure relates to computer networking.

BACKGROUND

Network operators face ever-changing requirements and technologies introduced over time. To reduce operational and capital investment, network operators generally try to consolidate service delivery in a single infrastructure that leverages minimal technology layers. Still, there are cases that combine multiple technology layers; in those cases, the infrastructure must be able to interwork with multiple deployed network technologies to provide a migration path over the various technologies.

BRIEF DESCRIPTION OF THE DRAWINGS

FIG. 13 illustrates a flowchart of a method for performing functions associated with operations discussed herein, according to an example embodiment.

DESCRIPTION OF EXAMPLE EMBODIMENTS

Overview

In one example embodiment, techniques are provided herein for extending an active measurement protocol with an Operations, Administration and Management/Maintenance (OAM) channel. A first Provider Edge (PE) node obtains from or provides to a second PE node, over a packet-switched network via an overlay, OAM data in an OAM channel of the active measurement protocol. The OAM data relates to a networking issue. The network issue is automatically resolved responsive to the OAM data.

EXAMPLE EMBODIMENTS

Figure 1:
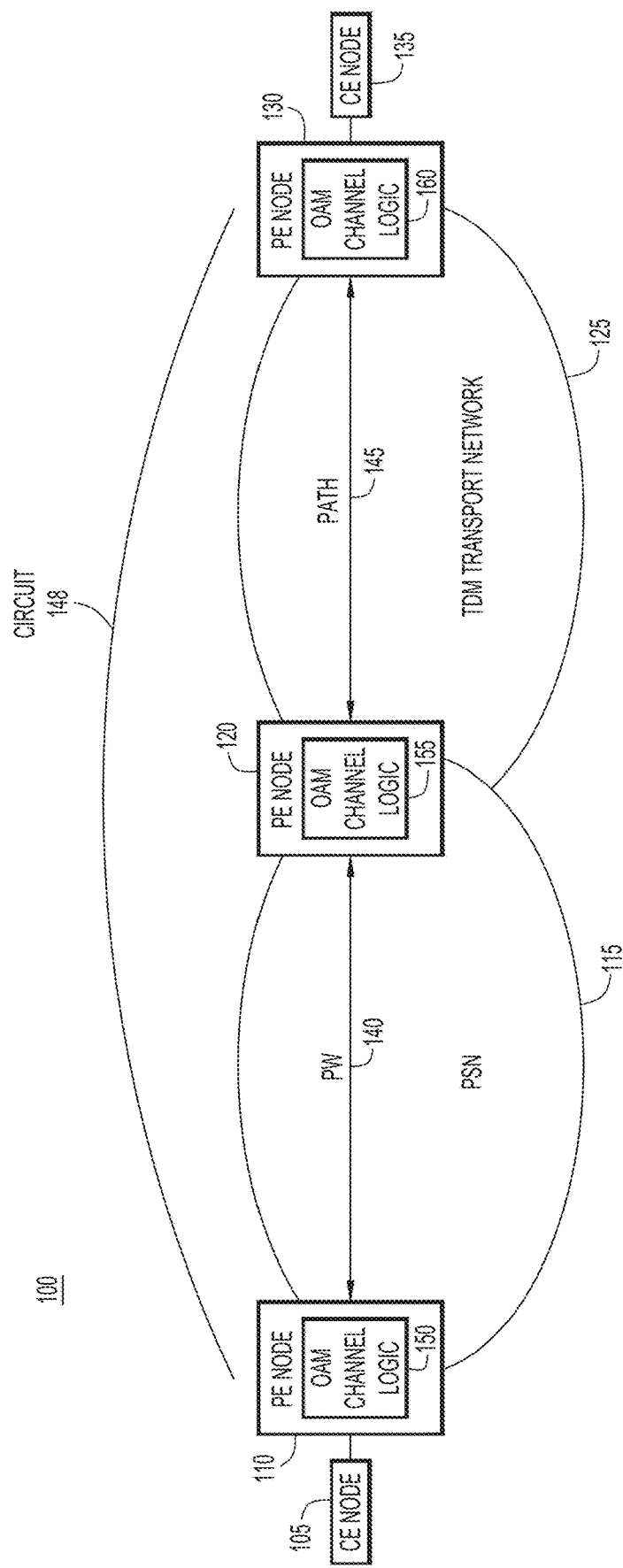
FIG. 1 illustrates a system, including a hybrid network, configured to extend an active measurement protocol with an Operations, Administration and Management/Maintenance (OAM) channel, according to an example embodiment.

FIG. 1 illustrates a system 100 configured to extend an active measurement protocol with an Operations, Administration and Management/Maintenance (OAM) channel, according to an example embodiment. System 100 includes Customer Edge (CE) node 105, Provider Edge (PE) node 110, Packet-Switched Network (PSN) 115, PE node 120, Time-Division Multiplexing (TDM) transport network 125, PE node 130, and CE node 135. PE node 110 and PE node 130 serve as respective edge nodes of the hybrid network, and PE node 120 acts as a gateway node between PSN 115 and TDM transport network 125. PE node 130 may also be referred to as a trail termination endpoint.

Pseudowire (PW) 140 is configured on, and enables communication between, PE node 110 and PE node 120. PW 140 is one example of an overlay that is configured to provide a connection-oriented service. PSN 115 may include one or more transit nodes (not shown) configured to carry PW network packets between PE node 110 and PE node 120. The transit nodes may be agnostic to PW 140.

TDM transport network 125 includes path 145, which enables communication between PE node 120 and PE node 130. TDM transport network 125 may include one or more transit nodes (not shown) configured to carry signals between PE node 120 and PE node 130. In one example, path 145 provides a connection via a set of timeslot cross-connects in each transit node along path 145. Together, PW 140 and path 145 form circuit 148.

Any suitable mix of domains may converge in the hybrid network, such as, and not limited to, Ethernet Virtual Private Wire Service (Ethernet VPWS); TDM-centric VPWS such as Structure-Agnostic TDM over Packet (SAToP), Circuit Emulation over Packet (CEP), Circuit Emulation Services over Packet (CESoP), and Private Line Emulation (PLE); Synchronous Optical Network (SONET) circuit emulation; Synchronous Digital Hierarchy (SDH) circuit emulation; Plesiochronous Digital Hierarchy (PDH) circuit emulation; Optical Transport Networking (OTN); SONET/SDH; Ethernet G.8031; Ethernet G.8032; etc. Specific examples of possible combinations of network technologies include: PLE and OTN; CEP and SONET; CEP and SDH; Ethernet VPWS and OTN; and Ethernet VPWS and G.803x. Any nomenclature used herein that is specific to a given technology may be substituted for appropriate nomenclature that is applicable to any other suitable technology.

PSN 115 may utilize any suitable transport mechanism (e.g., Ethernet). PSN 115 may run Multiprotocol Label Switching (MPLS), an Interior Gateway Protocol (IGP) such as Open Shortest Path First (OSPF) or Intermediate System-to-Intermediate System (IS-IS), or any combination thereof. PSN 115 may also run a traffic engineering protocol such as Resource Reservation Protocol for Traffic Engineering (RSVP-TE) or Segment Routing for Traffic Engineering (SR-TE). Any suitable paradigm/protocol may be utilized in conjunction with the techniques presented herein for PSN 115. PSN 115 may use any suitable packet switching and/or tunneling technology, such as Layer 2 Tunneling Protocol (L2TP), User Datagram Protocol (UDP), Internet Protocol (IP), etc. PSN 115 may also/alternatively be based on IP or Segment Routing for IP version 6 (SRv6). TDM transport network 125 may also utilize any suitable transport mechanism(s), such as SONET, SDH, OTN technology, etc.

Moreover, PW 140 may be established via any suitable technology, such as Targeted Label Distribution Protocol (T-LDP) for VPWS or Border Gateway Protocol (BGP) as defined by Ethernet Virtual Private Network for VPWS (EVPN-VPWS). In one example, PW 140 may belong to a PLE circuit (e.g., circuit 148). To that end, PE node 110 and PE node 120 may be configured to communicate using PLE techniques, though it will be appreciated that other scenarios, such as Circuit Emulation (CEM), may also apply. In another example, Ethernet VPWS may be used in conjunction with Ethernet over SONET across TDM transport network 125.

PSN 115 and TDM transport network 125, taken together, may be considered a single hybrid network. This hybrid network may remain in use until a network operator can phase out legacy technologies and switch to a single-domain infrastructure. The process of phasing-out legacy technologies can be lengthy; as a result, the network operator may need to rely on system 100 for a relatively long period of time. In one example, system 100 may be used to deliver a service (e.g., circuit 148, trail, etc.) from PE node 110 to PE node 130.

Described herein are techniques for extending an active measurement protocol with an OAM channel. Implementing an extensible OAM channel as part of the active measurement protocol may enable any suitable kind of information to be exchanged in system 100. For example, in addition to performance measurements of PW 140 (e.g., delay measurements, packet loss measurements, liveness checking/monitoring to detect failures, etc.), data may be exchanged as OAM information. The OAM information may relate to: liveness detection; protection switch information/co-ordination messages (e.g., messages for OTN Automatic Protection Switching (APS) or SONET/SDH K1/K2 bytes); supervision messages (e.g., messages, sent over an optical supervisory channel, relating to performance, fault, configuration, security, accounting, payload mismatch and misconnection detection, connection state synchronization, forward and backward fault propagation, etc.); and/or networking state information (e.g., the state(s) of multi-homing nodes, backward and forward fault indication, etc.).

Thus, a single protocol is provided that, in addition to performing active measurements such as failure detection, delay measurements, loss measurements, etc., may also perform OAM communication. This extended protocol may provide an extensible framework and implementation synergies with performance measurements. The extended protocol may also simplify management processes by reducing the number of protocols required in a network, thereby mitigating both operational complexity for network operators and development costs for equipment vendors. Exchanging OAM (e.g., protection switching) messages over PWs by extending the active measurement protocol may provide operational simplification for network operators and development synergies for equipment vendors.

In one example, an active measurement protocol involves a sender (e.g., one of PE node 110 or PE node 130) and a receiver (e.g., the other of PE node 110 or PE node 130). The sender may be configured to provide a measurement test packet to the receiver. The receiver may be configured to, responsive to the measurement test packet, provide a measurement test reply packet to the sender. The active measurement protocol may be a two-way active measurement protocol (e.g., Two-Way Active Measurement Protocol (TWAMP), Simple TWAMP (STAMP), TWAMP Light, etc.).

To extend an active measurement protocol to provide an OAM channel, PE nodes 110, 120, and 130 are provided with OAM channel logic 150, 155, and 160, respectively. One or more of OAM channel logic 150, 155, or 160 may enable system 100 to carry-out techniques described herein. For example, PE node 110 may obtain from, or provide to, PE node 130, OAM data in an OAM channel of an active measurement protocol. PE node 110 may obtain or provide the OAM data over PSN 115 via PW 140. PE node 120 may translate OAM data between an active measurement protocol format (e.g., suitable for PSN 115, such as ODUk) and a TDM transport network format (e.g., suitable for TDM transport network 125).

The OAM data may relate to a networking issue, and system 100 may, responsive to the OAM data, automatically resolve the networking issue. For example, PE nodes 110, 120, and/or 130 (and/or any other suitable network entity/ entities) may automatically resolve the networking issue. The networking issue may relate to a networking event, networking state, protection switch information, etc.

It will be appreciated that the OAM data may be provided or obtained over any suitable overlay. In one example, the overlay may be PW 140, but the techniques described herein may allow for other types of overlays. In one example, the overlay may be an Internet Protocol (IP) tunnel. In other examples, the overlay may include tunneling solutions based on technologies such as Virtual Extensible Local Area Network (VxLAN), Layer 2 Tunneling Protocol version 3 (L2TPv3), MPLS over UDP (MPLSoUDP), SR, Ethernet VPWS, PLE VPWS, etc. These techniques may be client-independent and applicable to any suitable PW/overlay technology.

Figure 2:
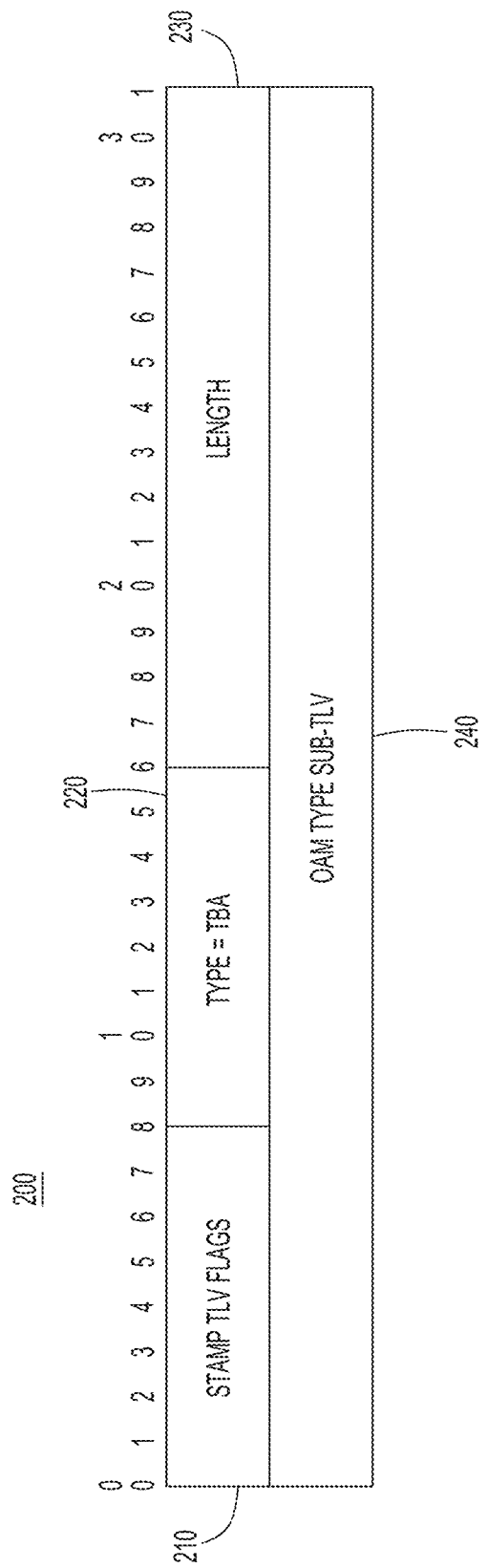
FIG. 2 illustrates a Simple Two-Way Active Measurement Protocol (STAMP) Type Length Value (TLV) for an OAM channel, according to an example embodiment.

FIG. 2 illustrates a STAMP Type Length Value (TLV) 200 for an OAM channel, according to an example embodiment. Format 200 includes STAMP TLV flags field 210, type field 220, length field 230, and OAM type sub-TLV field 240. OAM type sub-TLV field 240 may be leveraged to facilitate various supervision functions and/or APS information exchanges, as discussed in connection with FIGS. 3-11 below. STAMP TLV 200 may be mapped between technology-specific OAM (e.g., protection switching) encodings in hybrid PSN and TDM transport network deployments.

STAMP TLV 200 enables a STAMP-based generic PW OAM control channel/session. That is, STAMP TLV 200 may define a channel type for STAMP to carry PW OAM packets. In one example, STAMP TLV 200 may extend STAMP to signal and monitor not only the state of optical/ TDM attachment circuits (User Network Interfaces (UNIs)), but also the connectivity between PE nodes 110 and 130 (FIG. 1). The OAM channel may be extensible because OAM type sub-TLV field 240 may be defined to address present or future enhancements/use cases.

STAMP TLV 200 may be encapsulated in an IP/UDP header. The IP/UDP header may be compatible with overlay/ tunneling solutions other than PW. Because the IP/UDP header uses IP technology, STAMP TLV 200 may be provided to any node that has IP reachability. Because the IP/UDP header uses UDP technology, hardware may be programmed to process STAMP TLV 200; additionally/ alternatively, the packet including STAMP TLV 200 may be punted to an appropriate hardware location (e.g., offload engine or Line Card (LC) Central Processing Unit (CPU) or Field-Programmable Gate Array (FPGA)). High-scale infrastructure that supports STAMP (e.g., a hardware offload engine configured for 3.3 msec probe intervals) may be leveraged. Processing STAMP TLV 200 in hardware may allow rate-limiting against Denial of Service (DoS) and other security attacks.

A PW associated channel (PW Ach) header may be added to the packet header encapsulating STAMP TLV 200. In one example, the first four bits of the control word in the PW Ach header may be set to 0001. The STAMP OAM message/packet that includes STAMP TLV 200 may be encapsulated with the same transport Label-Switched Path (LSP) and PW labels as the service payload (e.g., VPWS data traffic) sent over the PW. Using the same label stack as the data traffic ensures that the STAMP OAM message/packet follows the same Equal Cost Multipath (ECMP) path as the VPWS data traffic being monitored. The handling of PW/Generic Ach (GAch) formatted STAMP OAM packets may resemble the handling of data packets in hardware.

With reference to FIG. 1, FIGS. 3-8 illustrate various use cases for transmitting supervision OAM messages and mapping the supervision OAM messages between a PSN format for PSN 115 and TDM equivalents for TDM transport network 125. In each use case, PE node 110 obtains or provides supervision data regarding transmissions between PE node 110 and PE node 130. Responsive to the supervision data indicating a presence of a networking issue, PE node 110, 120, and/or 130 may automatically resolve the networking issue. In one example, the supervision data may relate to a networking state, and the networking state may be automatically modified or synchronized.

As described in connection with FIGS. 3-8, the OAM channel may be used to address comprehensive OAM transmission supervision functions such as transmitting OAM data relating to continuity, connectivity, payload type, single-ended operations, alarm suppression, payload mismatch and misconnection detection, forward and backward fault propagation, etc. Each use case in FIGS. 3-8 may have bit/byte suitable for transmission in TDM transport network 125, and an associated OAM sub-TLV that carries corresponding information via OAM type sub-TLV field 240 (FIG. 2) in PSN 115.

Figure 3:
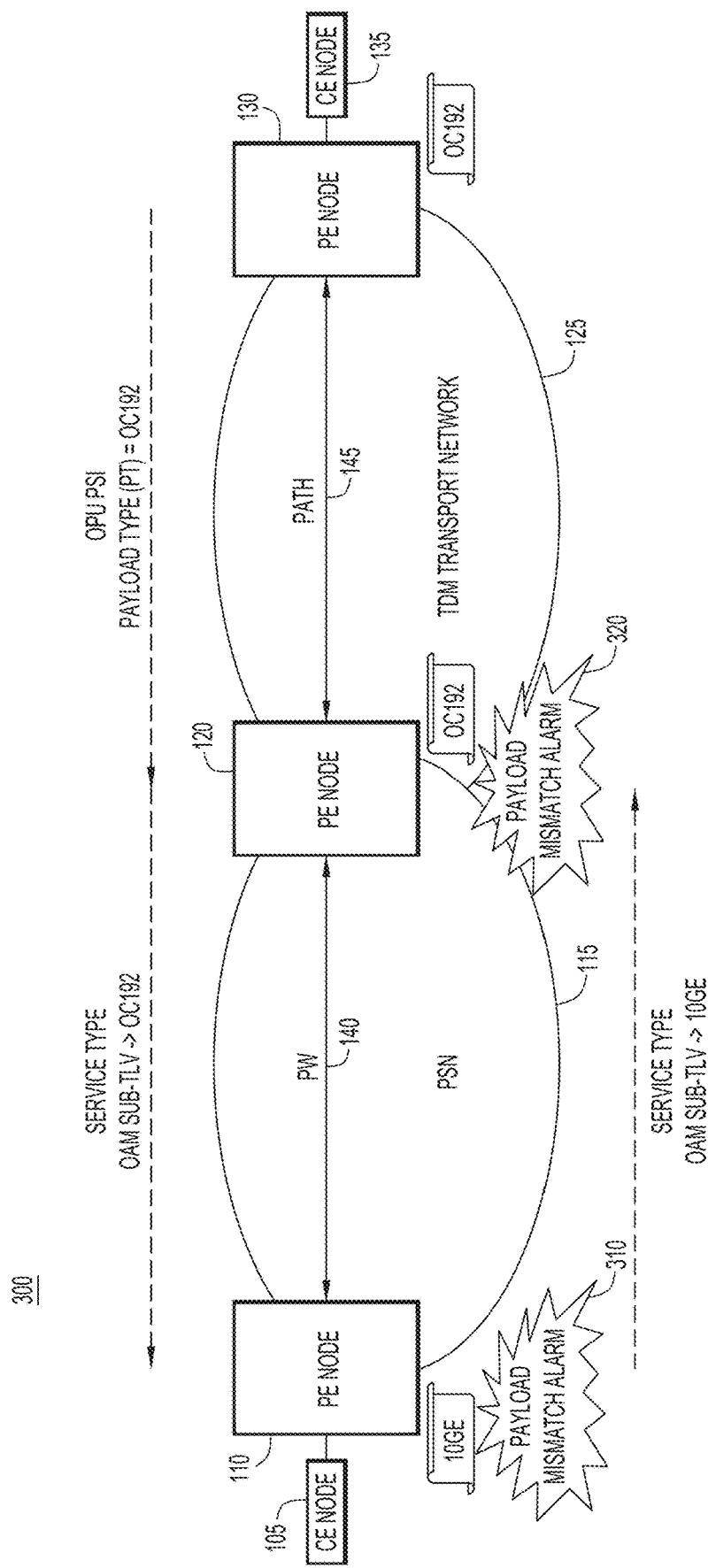
FIG. 3 illustrates a use case involving verifying payload type using the OAM channel, according to an example embodiment.

FIG. 3 illustrates a use case 300 involving verifying payload type using the OAM channel described herein, according to an example embodiment. More specifically, use case 300 involves verifying whether both endpoints of a service (PE nodes 110 and 130) are of the same payload type. In this example, an OC192 client on PE node 130 is connected across the TDM transport domain to PE node 120, which is also properly configured for OC192. However, the far-end client on PE node 110 is wrongly configured for 10GE, resulting in a payload mismatch. This may be a result of connecting the wrong clients together. The OAM sub-TLV for payload type enables detection of this situation and correction of the configuration.

More specifically, PE node 130 provides, to PE node 120, an Optical Payload Unit (OPU) Payload Structure Identifier (PSI) indicating that the payload type of the client on PE node 130 is OC192. PE node 120 obtains the OPU PSI and converts it to an active measurement protocol format (e.g., an OAM sub-TLV) suitable for transmission over PSN 115. PE node 120 provides an indication of the service type (OC192) as the OAM sub-TLV. PE node 110 obtains the indication, determines that there is a payload type mismatch (because the client on PE node 110 is configured for 10GE, which is not compatible with OC192), and generates payload mismatch alarm 310. PE node 110 provides an indication of the service type (10GE) as the OAM sub-TLV. PE node 120 obtains the indication and generates payload mismatch alarm 320. This, using the OAM channel in the active measurement protocol, PE node 110 and PE node 120 (and/or PE node 130) may become aware that there is a payload mismatch.

As illustrated in FIG. 3, in a hybrid network that includes a PSN and a TDM transport network, the OAM channel carries an indication of payload type in the PSN, and the payload type should be compatible with a corresponding TDM overhead on the other side of the hybrid network (e.g., in the TDM transport network). Table 1 below provides some examples of compatible payload types in a hybrid network where the OAM sub-TLV is mapped to/from the corresponding TDM overhead. Thus, Table 1 may be used to determine whether the payload types are mismatched.

TABLE 1

| Client type | VPWS OAM sub-TLV | OTN Payload Type | OTN OPU | SONET/SDH C2 | SONET/SDH GFP payload Type |
|---|---|---|---|---|---|
| Ethernet frames 10GBASE-R | Ethernet VPWS 10GBASE-R PLE | 0x05 0x03 | OPUk OPU2e | 0x05 0x05 | 0x01 0x13 0x18 |
| STM16/OC48 | STM16/OC48 PLE | 0x02 0x03 | OPU1 | N/A | N/A |
| STM64/OC192 | STM64/OC192 PLE | 0x02 0x03 | OPU2 | N/A | N/A |
| 2GFC | 2GFC PLE | 0x0D | OPU1 | 0x05 | 0x03 |

Figure 4:
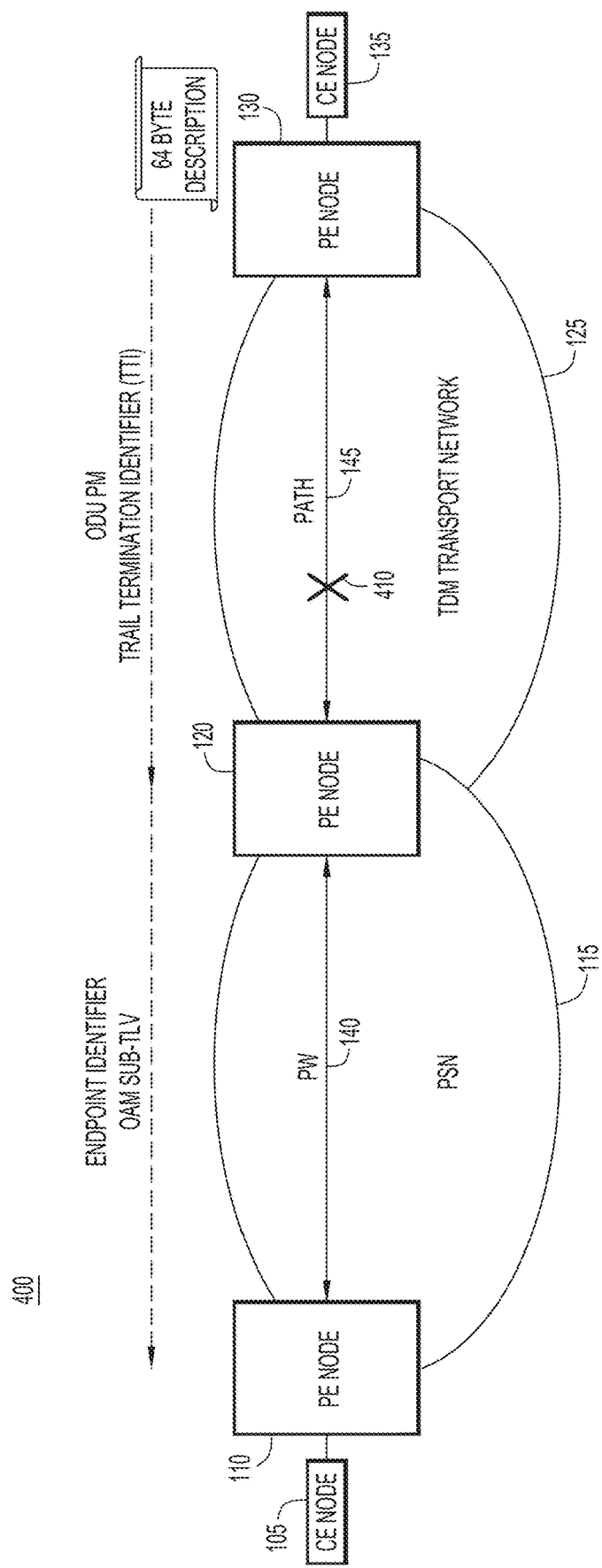
FIG. 4 illustrates a use case involving validating endpoints using the OAM channel, according to an example embodiment.

FIG. 4 illustrates a use case 400 involving validating endpoints using the OAM channel, according to an example embodiment. In this example, PE node 130 may provide a Trail Termination Identifier (TTI) in the form of a 64-byte description to PE node 120. The TTI may encode a customer, an account name, and an identifier, and may be used to validate endpoints (e.g., determine whether the wrong ports are connected). In accordance with techniques described herein, PE node 120 may map the TTI in TDM transport network 125 to an OAM sub-TLV that carries similar information (e.g., endpoint information) within a VPWS in PSN 115. In this example, the OAM sub-TLV may help identify mismatch 410.

Figure 5:
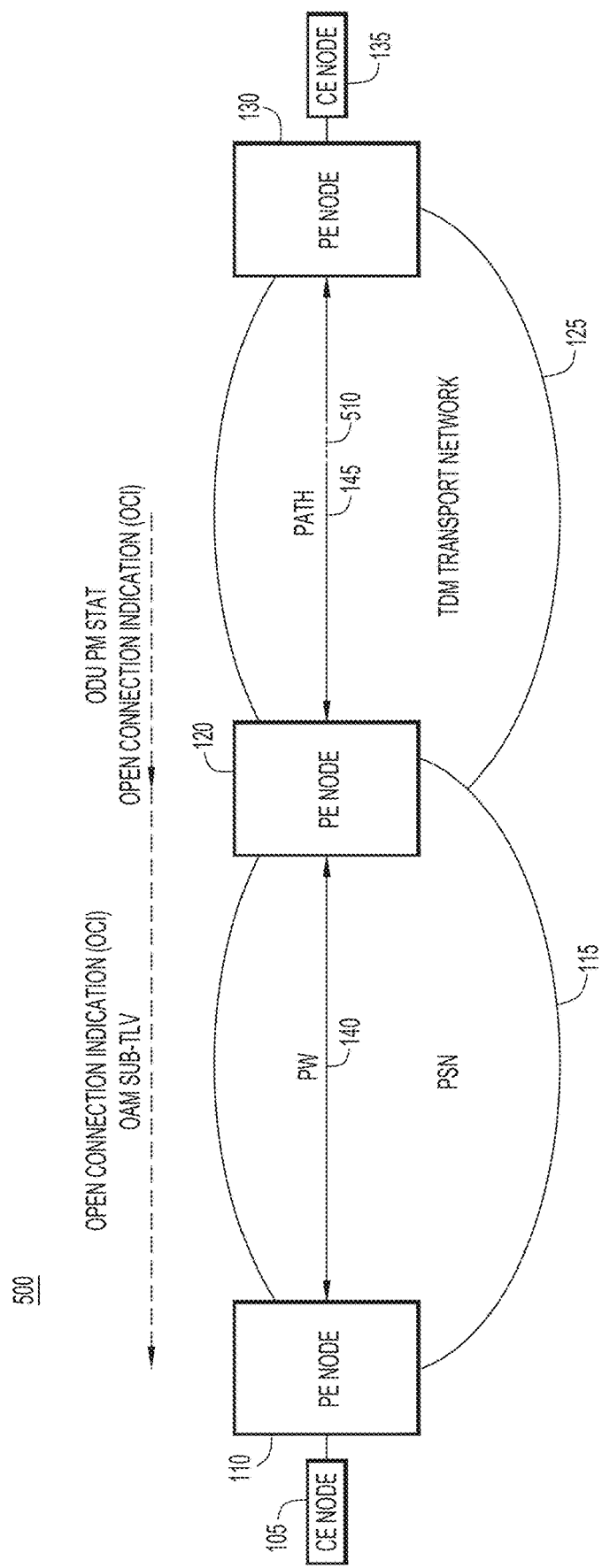
FIG. 5 illustrates a use case involving providing a notification regarding a misconfiguration using the OAM channel, according to an example embodiment.

FIG. 5 illustrates a use case 500 involving providing a notification regarding a misconfiguration using the OAM channel, according to an example embodiment. In this example, TDM transport network 125 generates an ODU Path Monitoring (PM) Status (STAT) Open Connection Indication (OCI), e.g., an indication that a service is not fully configured. As represented by dashed line 510, a device in TDM transport network 125 is missing an input-to-output cross-connect. The OCI signal informs downstream nodes within TDM transport network 125 of the misconfiguration. PE node 120 obtains the OCI signal, maps it to an OAM sub-TLV, and sends the OAM sub-TLV toward PE node 110. The OAM sub-TLV informs downstream nodes within PSN 115 of the misconfiguration.

Figure 6:
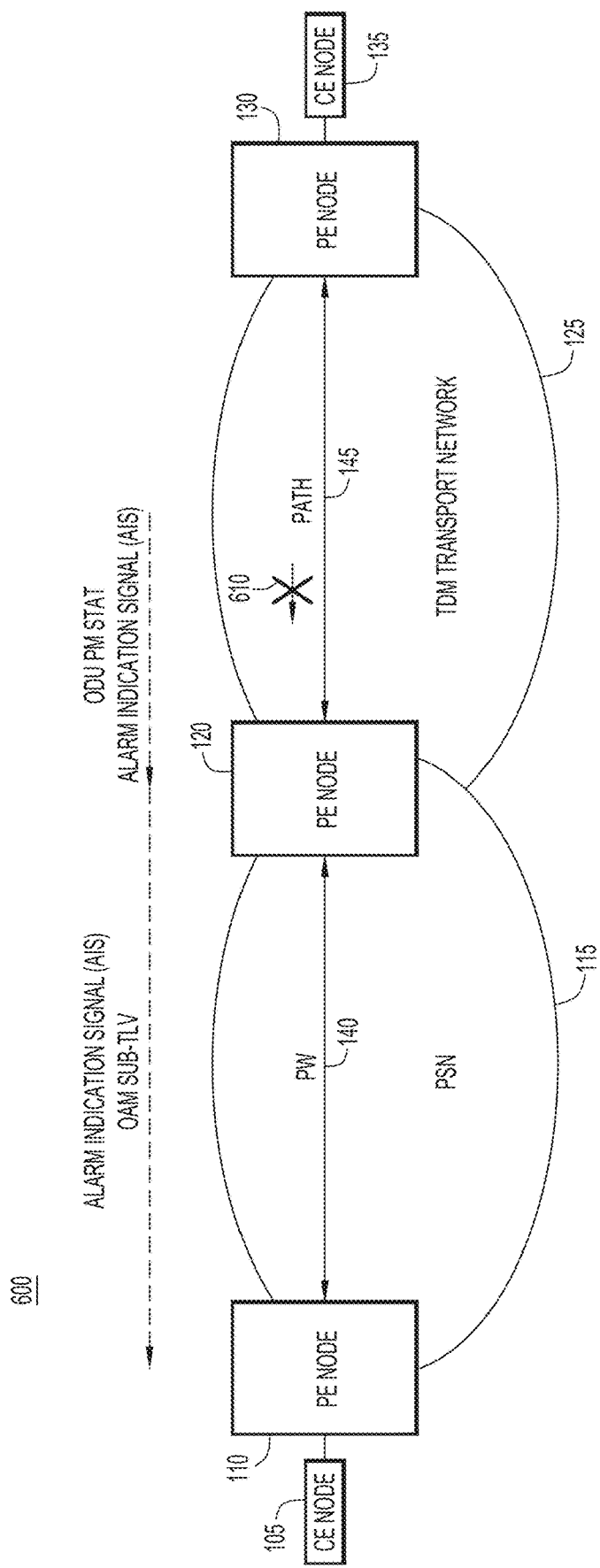
FIG. 6 illustrates a use case involving providing an alarm indication signal using the OAM channel, according to an example embodiment.

FIG. 6 illustrates a use case 600 involving providing an alarm indication signal using the OAM channel, according to an example embodiment. In this example, TDM transport network 125 generates an ODU PM STAT Alarm Indication Signal (AIS) regarding to provide a downstream notification regarding upstream failure 610. PE node 120 obtains the AIS, maps it to an OAM sub-TLV, and provides the OAM sub-TLV to PE node 110.

Figure 7:
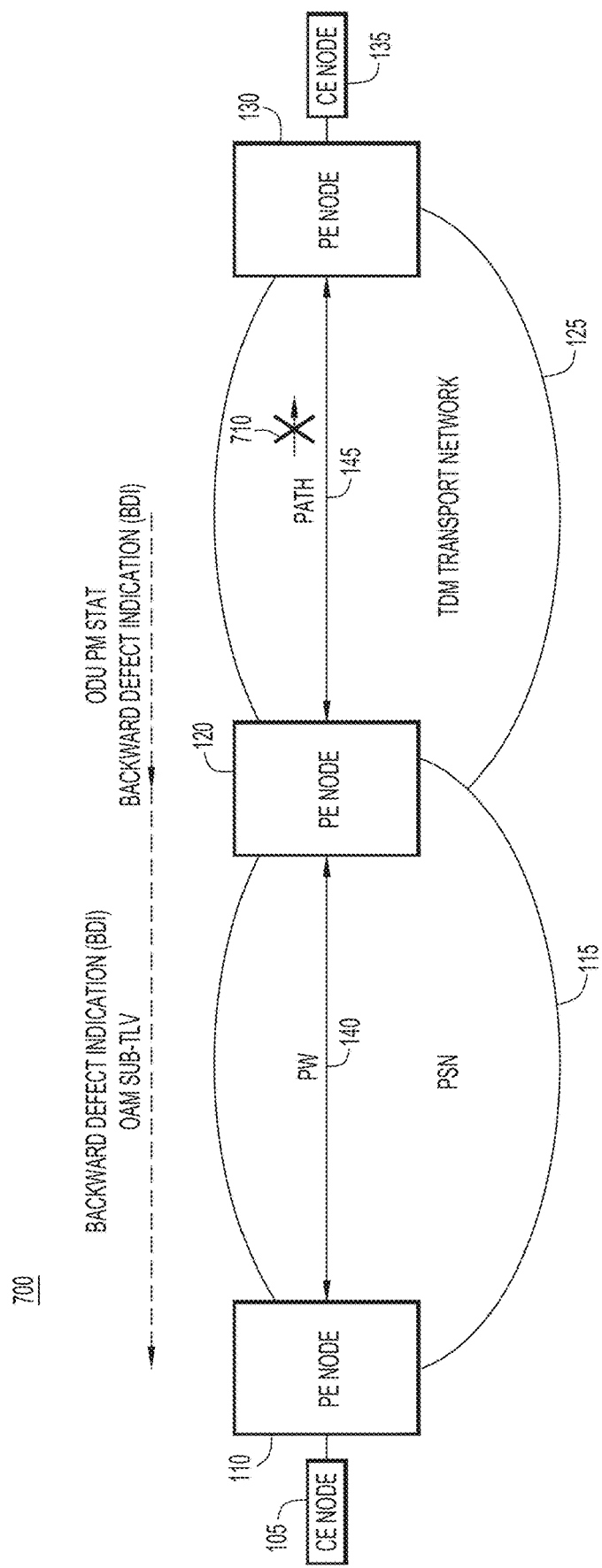
FIG. 7 illustrates a use case involving providing a backward fault notification using the OAM channel, according to an example embodiment.

FIG. 7 illustrates a use case 700 involving providing a backward fault/defect notification using the OAM channel, according to an example embodiment. In this example, TDM transport network 125 generates an ODU PM STAT Backward Defect Indication (BDI) to report backward defect 710. PE node 120 obtains the BDI overhead, maps it to a corresponding OAM sub-TLV, and provides the OAM sub-TLV to PE node 110 over PSN 115. The BDI may facilitate single-ended operations and troubleshooting.

Figure 8:
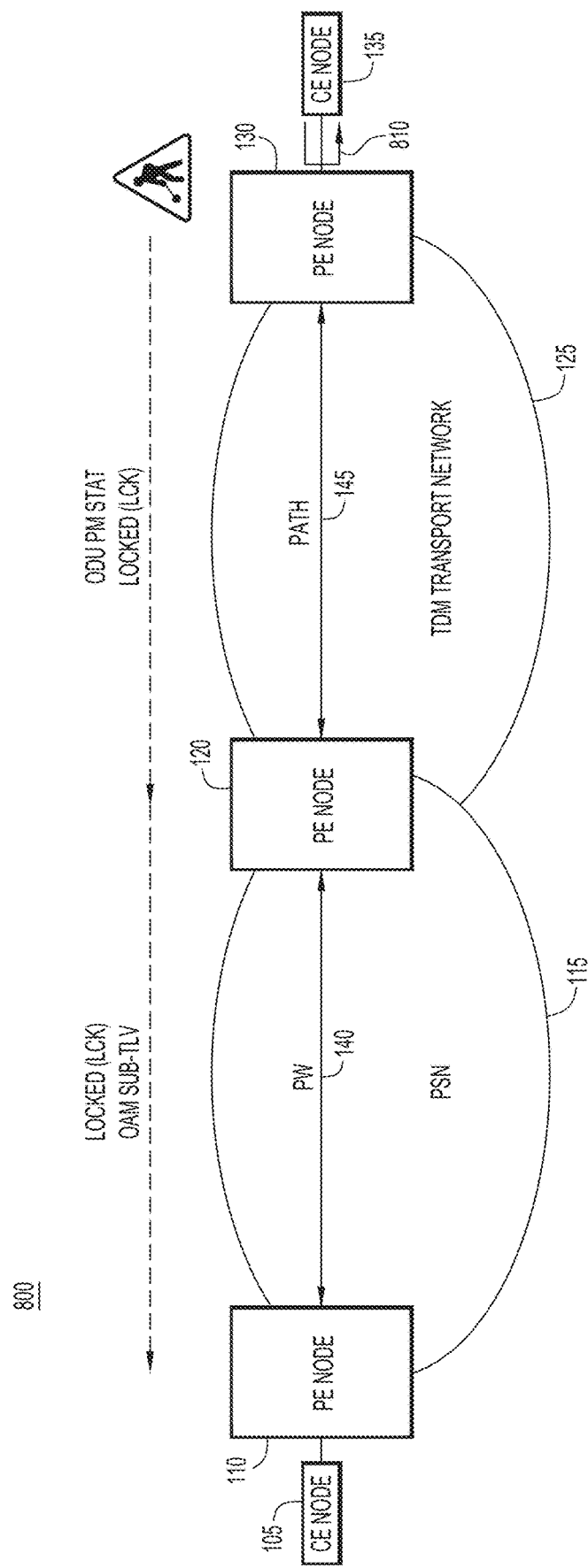
FIG. 8 illustrates a use case involving performing maintenance using the OAM channel, according to an example embodiment.

FIG. 8 illustrates a use case 800 involving performing maintenance using the OAM channel, according to an example embodiment. In this example, PE node 130 generates an ODU PM STAT Locked (LCK) signal to inform downstream nodes that the carried information is not actual client traffic. The LCK signal may be generated in response to loopback test 810 at CE node 135 (for example). PE node 130 provides the LCK signal to PE node 120 over TDM transport network 125. PE node 120 maps the LCK signal to a corresponding OAM sub-TLV and provides the OAM sub-TLV to PE node 110 over PSN 115.

Figure 9:
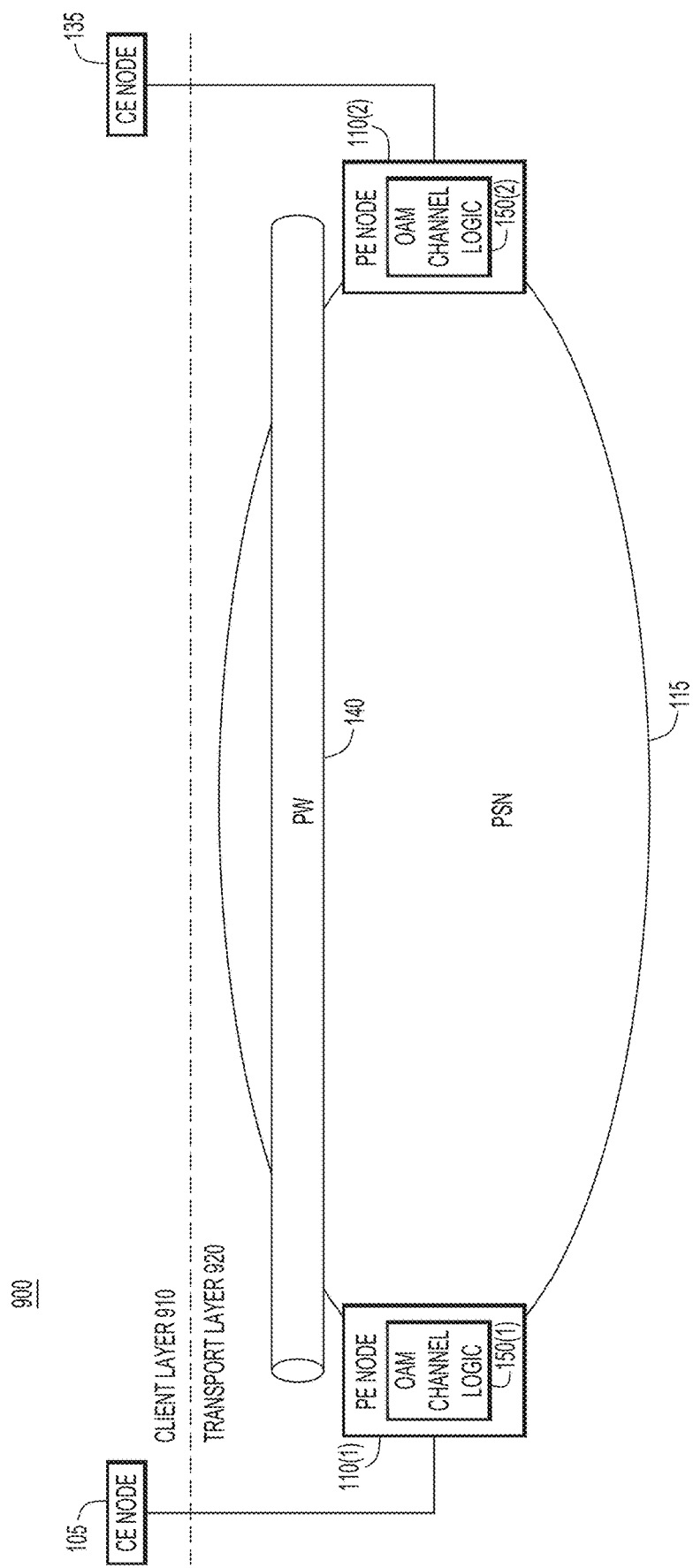
FIG. 9 illustrates a system, including a Packet-Switched Network (PSN), configured to extend the active measurement protocol with the OAM channel, according to an example embodiment.

FIG. 9 illustrates a system 900 configured to extend the active measurement protocol with the OAM channel, according to an example embodiment. System 900 includes CE node 105, PE node 110(1), PSN 115, PE node 110(2), and CE node 135. CE nodes 105 and 135 belong to client layer 910, and PE nodes 110(1) and 110(2) and PSN 115 belong to transport layer 920 (e.g., a VPWS transport layer). PE nodes 110(1) and 110(2) may be similar to PE node 110, and OAM channel logic 150(1) and 150(2) may be similar to OAM channel logic 150. PW 140 is configured on, and enables communication between, PE node 110(1) and PE node 110(2).

Whereas FIGS. 3-8 focus on a hybrid network scenario, FIG. 9 illustrates that OAM functions, such as transmission supervision, may also apply to single-network scenarios (e.g., PSN 115). In the example of FIG. 9, PE nodes 110(1) and/or 110(2) obtain or provide supervision data regarding transmissions between PE node 110(1) and PE node 110(2). Responsive to the supervision data indicating a presence of a networking issue, PE nodes 110(1) and/or 110(2) may automatically resolve the networking issue. In one example, the supervision data may relate to a networking state, and the networking state may be automatically modified or synchronized.

In one example, PSN 115 may have been consolidated from a hybrid network to a single network. One advantage to applying the OAM channel in a single-network scenario is that, in the case of an Ethernet PW scenario, the OAM channel (e.g., transport layer 920) may be independent of client layer 910. This may allow providers to validate PW 140 independent from customer activity. Conventional approaches run at the Ethernet layer inside the PW, and as a result, can interfere with the customer. By contrast, the techniques described herein may enable validation of PW 140 without interfering with the customer.

Figure 10:
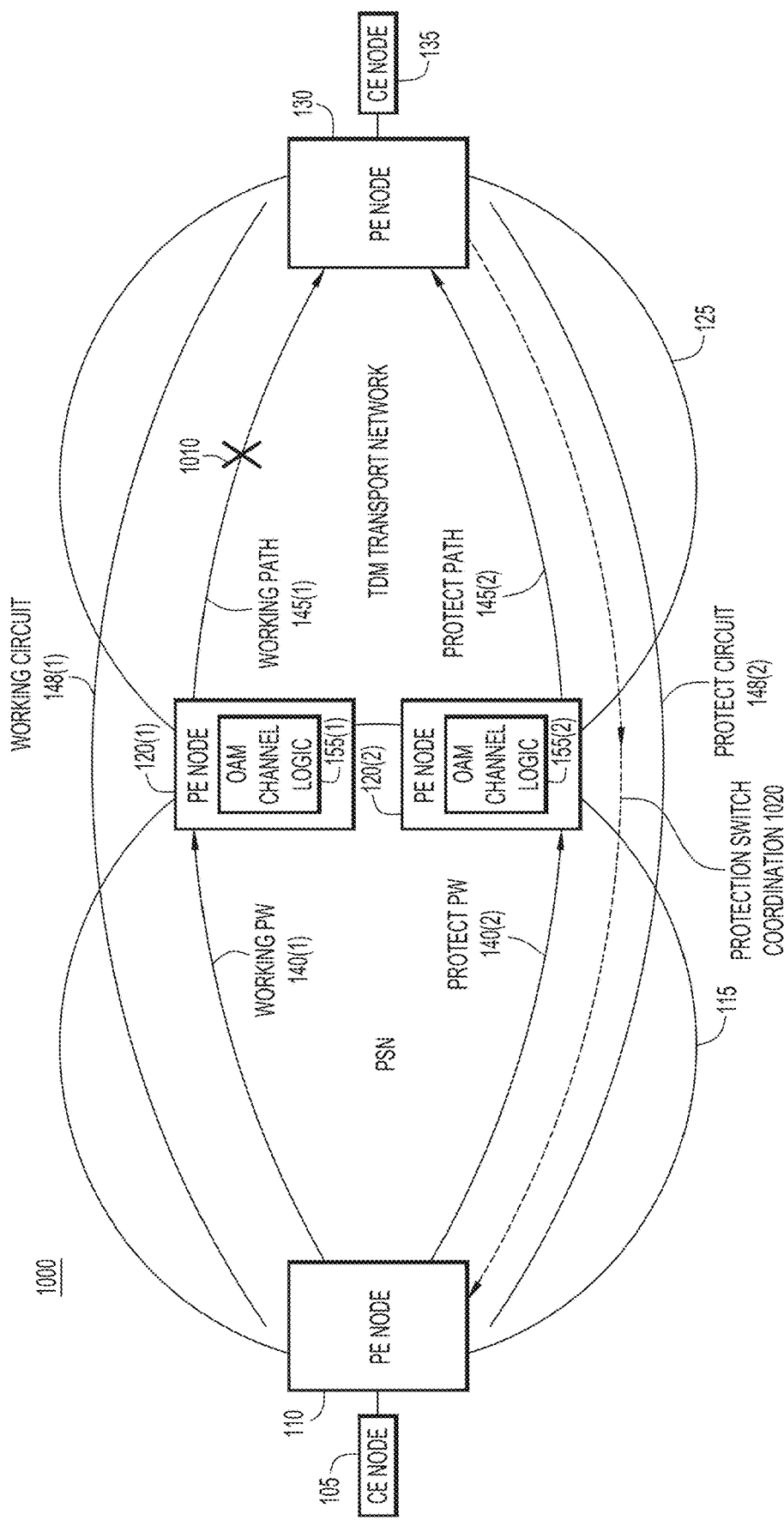
FIG. 10 illustrates a system, including a hybrid network, configured to perform protection switch coordination using the OAM channel, according to an example embodiment.
Figure 11:
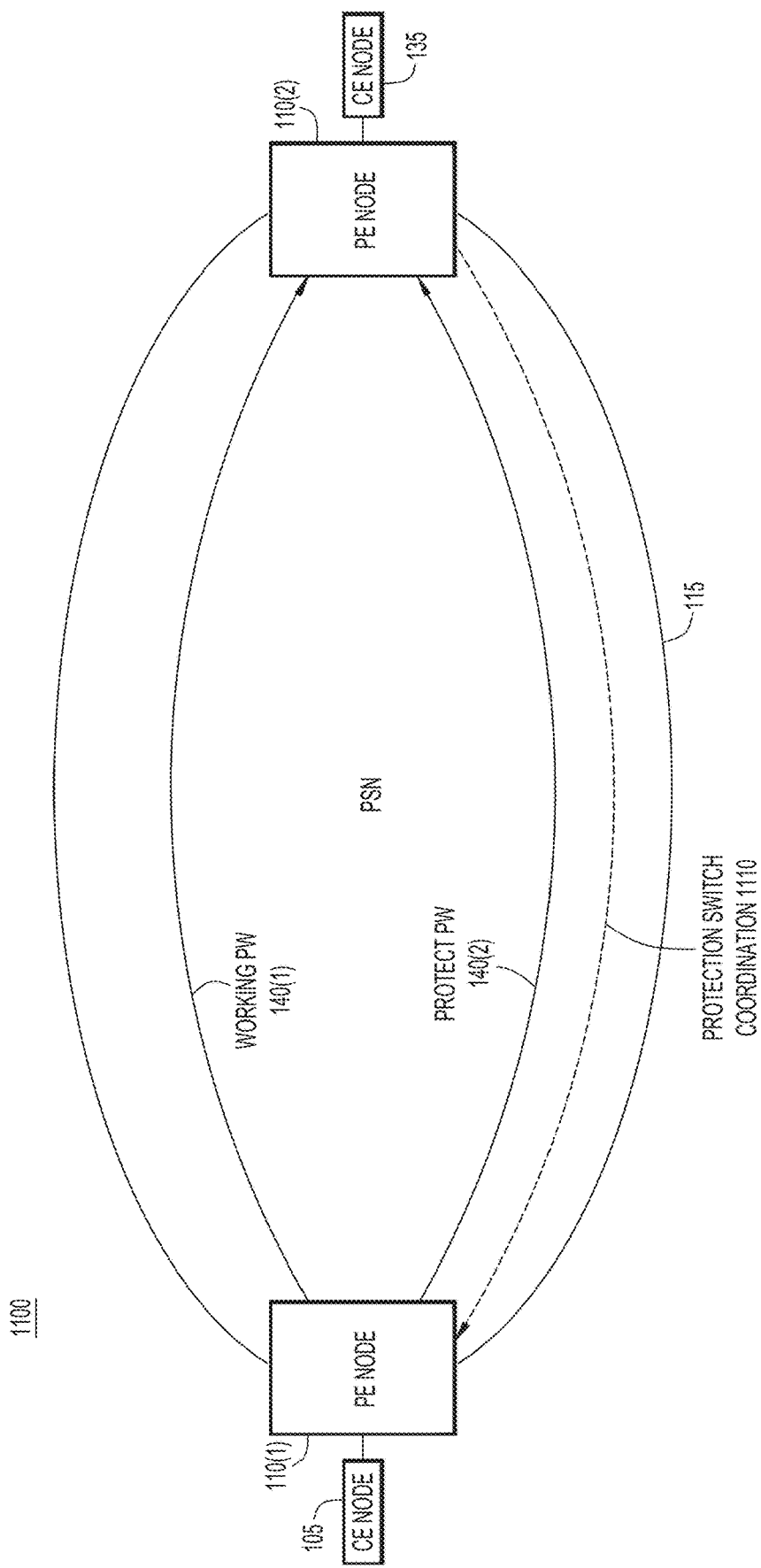
FIG. 11 illustrates a system, including a PSN, configured to perform protection switch coordination using the OAM channel, according to an example embodiment.

With continued reference to FIG. 1, FIGS. 10 and 11 illustrate use cases for Automatic Protection Switching (APS) information exchange. FIG. 10 illustrates system 1000, including a hybrid network, configured to perform protection switch coordination using the OAM channel, according to an example embodiment. System 1000 includes CE node 105, PE node 110, PSN 115, PE nodes 120(1) and 120(2), TDM transport network 125, PE node 130, and CE node 135.

PE nodes 120(1) and 120(2) may include OAM channel logic 155(1) and 155(2), respectively. PE nodes 120(1) and 120(2) may be similar to PE node 120, and OAM channel logic 155(1) and 155(2) may be similar to OAM channel logic 155. System 1000 also includes working PW 140(1), working path 145(1), protect PW 140(2), and protect path 145(2). Together, working PW 140(1) and working path 145(1) form working circuit 148(1), and protect PW 140(2) and protect path 145(2) form protect circuit 148(2).

In system 1000, PSN 115 and TDM transport network 125 have redundant interconnections to ensure continuous operation of services across PSN 115 and TDM transport network 125. To protect against failures anywhere in PSN 115 and TDM transport network 125, working circuit 148(1) is established between PE node 110 and PE node 130 through PE node 120(1), and protect circuit 148(2) is established between PE node 110 and PE node 130 through PE node 120(2). System 1000 may employ a 1+1 path protection scheme with bi-directional switching, whereby client information of the service is continuously sent across both working circuit 148(1) and protect circuit 148(2).

In this example, failure 1010 occurs along working path 145(1) between PE node 120(1) and PE node 130. PE node 130 detects failure 1010 and autonomously switches to pick up traffic from protect path 145(2). However, because failure 1010 is uni-directional, PE node 110 cannot detect failure 1010 and therefore does not immediately switch to protect PW 140(2). As shown at operation 1020, to ensure that traffic of the service continues to be sent along the same route (here, protect circuit 148(2)) in both directions and thereby enable protection switch coordination, PE node 130 provides protection switch information to PE node 110. Responsive to the protection switch information, PE node 110 automatically switches from working circuit 148(1) to protect circuit 148(2).

More specifically, PE node 130 provides the protection switch information to PE node 110 toward PE node 120(2), over protect circuit 148(2). PE node 120(2) may perform a gateway/mapping function between the PW OAM channel in PSN 115 and the respective protection overhead channel in TDM transport network 125. Thus, using the mapping function and PW-to-TDM path dataplane gateway function, system 1000 may avoid compromising OAM and protection functionality. In this example, PE node 120(2) may obtain APS/PCC or SONET/SDH K1/K2 signals from TDM transport network 125 and convert those signals to an OAM sub-TLV suitable for PSN 115.

The OAM sub-TLV may carry protection switch information (e.g., protection state and request information). The OAM sub-TLV may, for example, be an APS sub-TLV configured to carry APS information between PE node 120(2) and PE node 110. PE node 120(2) may provide the OAM sub-TLV in the OAM channel, over PSN 115, to PE node 110. Upon receipt of the OAM-sub-TLV, PE node 110 may switch over to protect PW 140(2). As a result, protection switch coordination may be achieved via protect circuit 148(2) using technology-specific overhead and messaging.

It will be appreciated that the techniques described herein may apply to any suitable switchover scenario. PE node 110 may obtain or provide protection switch information as OAM data. Responsive to the protection switch information, PE node 110 and/or PE node 130 may automatically switch from working circuit 148(1) to protect circuit 148(2). The protection switch information may be exchanged via a PW OAM channel and mapped to TDM equivalents. To maintain resiliency, protection switch messaging may be performed between PE node 130 and PE node 110 via PE node 120(2), via protect circuit 148(2). Advantageously, the techniques described herein may avoid relying on: a backward failure indication from PE node 130 to PE node 110 via PE node 120(1); a protocol between PE nodes 120(1) and 120(2); and/or messaging between PE nodes 110 and 120(1).

Tables 2-5 below illustrate OAM APS sub-TLVs and corresponding SONET/SDH and OTN mappings for various use cases. Table 2 applies to switch requests; Table 3 applies to PT fields; Table 4 applies to requested signals; and Table 5 applies to bridged signal fields. For Table 3, x=0 indicates a non-revertive operation and x=1 indicates a revertive operation, for both PW OAM APS and OTN APS/PCC.

TABLE 2

| VPWS APS sub-TLV | OTN Request/State(4) | SONET/SDH K1(bits 1-4) |
|---|---|---|
| Lockout of protection (LoP) | 1111 | 1111 |
| Forced switch (FS) | 1110 | 1110 |
| Signal fail (SF) | 1100 | 1101 |
|  |  | 1100 |
| Signal degrade (SD) | 1010 | 1011 |
|  |  | 1010 |
| Manual switch (MS) | 1000 | 1000 |
| Wait to restore (WTR) | 0110 | 0110 |
| Exercise (EXER) | 0100 | 0100 |
| Reverse request (RR) | 0010 | 0010 |
| Do not revert (DNR) | 0001 | 0001 |
| No request (NR) | 0000 | 0000 |

TABLE 3

| VPWS APS sub-TLV | OTN PT | SONET/SDH K2 bit 5 |
|---|---|---|
| 1 + 1 unidirectional, no APS | 000x | 0 |
| 1 + 1 unidirectional with APS | 100x | N/A |
| 1 + 1 bidirectional with APS | 101x | 0 |
| 1:n unidirectional with APS | 110x | 1 |
| 1:n bidirectional with APS | 111x | 1 |

TABLE 4

| VPWS APS sub-TLV | OTN Requested signal (8) | SONET/SDH K1 bits 5-8 |
|---|---|---|
| Null signal requested | 0 | 0 |
| Normal signal requested | 1-14 | 1-14 |
|  | 15-254 | N/A |
| Extra traffic signal requested | 255 | 15 |

TABLE 5

| VPWS APS sub-TLV | OTN Bridged signal (8) | SONET/SDH K2 bits 1-4 |
|---|---|---|
| Null signal bridged | 0 | 0 |
| Normal signal bridged | 1-14 | 1-14 |
|  | 15-254 | N/A |
| Extra traffic signal bridged | 255 | 15 |

FIG. 11 illustrates a system 1100, including PSN 115, configured to perform protection switch coordination using the GAM channel, according to an example embodiment. System 1100 includes CE node 105, PE node 110(1), PSN 115, PE node 110(2), and CE node 135. PE nodes 110(1) and 110(2) are configured to communicate over working PW 140(1) and protect PW 140(2). It will be appreciated that, in this example, working PW 140(1) and protect PW 140(2) may also be referred to as working and protect circuits, respectively.

Whereas FIG. 10 dealt with a hybrid network scenario, FIG. 11 illustrates a single-network scenario (e.g., PSN 115).

In one example, PSN 115 may have been consolidated from a hybrid network to a single network. As shown at operation 1110, PE nodes 110(1) and/or 110(2) may perform protection switch coordination by obtaining or providing protection switch information as OAM data over protect PW 140(2). The OAM data may, for instance, include an APS OAM sub-TLV that provides a service recovery mechanism that is similar to APS in a single TDM domain. Responsive to the protection switch information, PE nodes 110(1) and/or 110(2) may automatically switch from working PW 140(1) to protect PW 140(2).

The techniques described herein may apply to any suitable network topology, such as multi-PSN scenarios. For example, OAM sub-TLVs may be exchanged between two or more PSNs. One or more of the PSNs may be external.

Figure 12:
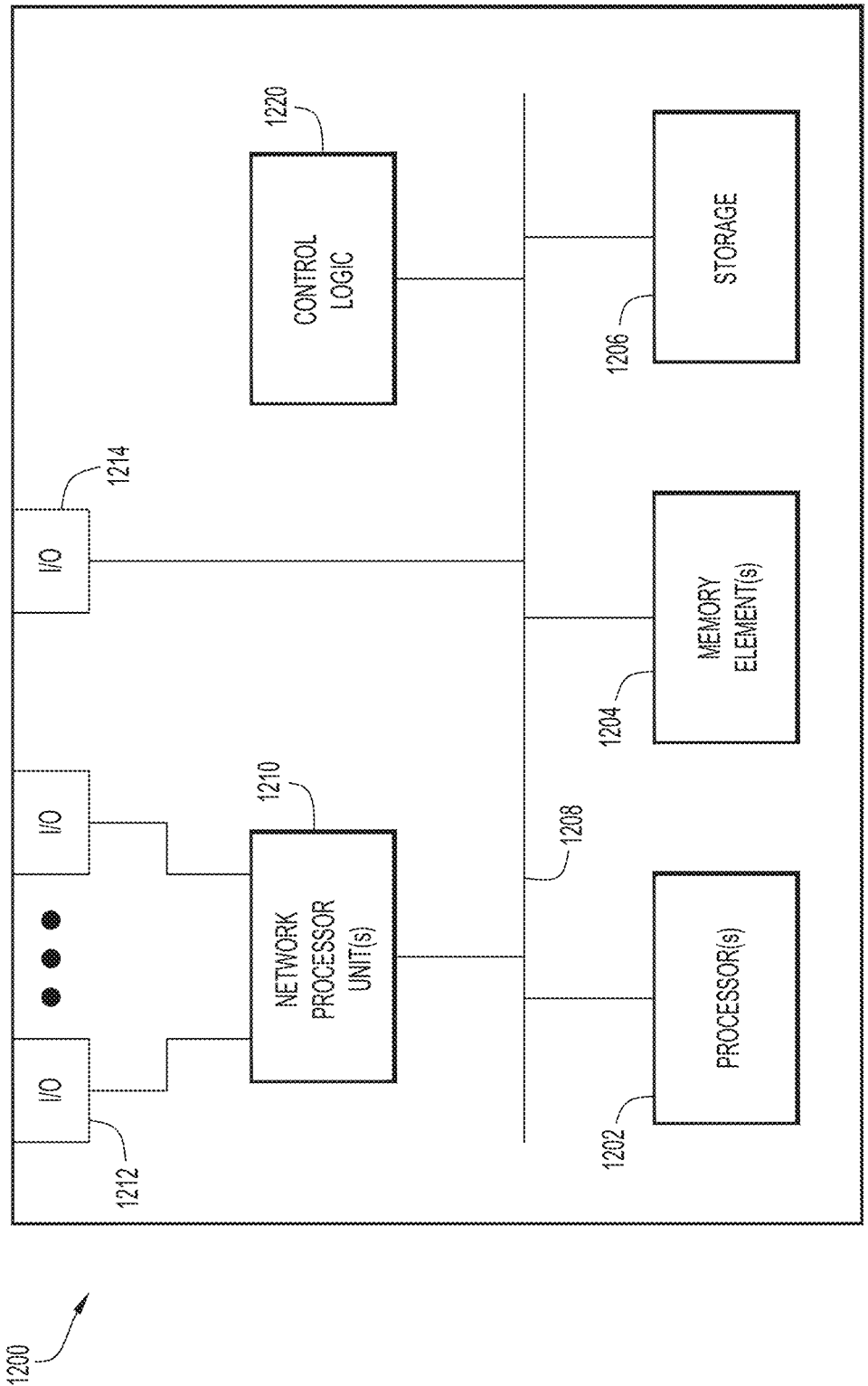
FIG. 12 illustrates a hardware block diagram of a computing device configured to perform functions associated with operations discussed herein, according to an example embodiment.

Referring to FIG. 12, FIG. 12 illustrates a hardware block diagram of a computing device 1200 that may perform functions associated with operations discussed herein in connection with the techniques depicted in FIGS. 1-11. In various embodiments, a computing device, such as computing device 1200 or any combination of computing devices 1200, may be configured as any entity/entities as discussed for the techniques depicted in connection with FIGS. 1-11 in order to perform operations of the various techniques discussed herein.

In at least one embodiment, computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory elements 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, and/or any other I/O port(s) now known or hereafter developed. Thus, the network processor unit(s) 1210 and/or network I/O interfaces 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device 1200; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory elements 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 1200 for transfer onto another computer readable storage medium.

FIG. 13 is a flowchart of an example method 1300 for performing functions associated with operations discussed herein. Method 1300 may be performed by any suitable entity, such as PE nodes 110, 110(1), 110(2), 120, and/or 130. At operation 1310, a first PE node (e.g. PE node 110, 110(1), or 110(2)) obtains from or provides to a second PE node (e.g., PE node 110(2), 120, or 130), over a packet-switched network via an overlay, Operations, Administration and Management/Maintenance (OAM) data in an OAM channel of an active measurement protocol. The OAM data relates to a networking issue. At operation 1320, the network issue is automatically resolved responsive to the OAM data.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a first provider edge node, obtaining from or providing to a second provider edge node over a packet-switched network via an overlay, OAM data in an OAM channel of an active measurement protocol, wherein the OAM data relates to a networking issue; and responsive to the OAM data, automatically resolving the networking issue.

In one example, obtaining or providing the OAM data over the packet-switched network includes: obtaining or providing the OAM data over a hybrid network that includes the packet-switched network and a time-division multiplexing transport network. In a further example, the method further comprises: at a third provider edge node located between the packet-switched network and the time-division multiplexing transport network, translating the OAM data between an active measurement protocol format and a time-division multiplexing transport network format.

In one example, obtaining or providing the OAM data includes obtaining or providing supervision data regarding transmissions between the first provider edge node and the second provider edge node; and automatically resolving the networking issue includes automatically resolving the networking issue responsive to the supervision data indicating a presence of the networking issue. In a further example, the supervision data relates to a networking state, and automatically resolving the networking issue includes: automatically modifying or synchronizing the networking state.

In one example, obtaining or providing the OAM data includes obtaining or providing protection switch information; and automatically resolving the networking issue includes, responsive to the protection switch information, automatically switching from a working circuit between the first provider edge node and the second provider edge node to a protect circuit between the first provider edge node and the second provider edge node.

In one example, the active measurement protocol involves a sender and a receiver, the sender is configured to provide a measurement test packet to the receiver, and the receiver is configured to, responsive to the measurement test packet, provide a measurement test reply packet to the sender.

In one example, the overlay is a pseudowire. In another example, the overlay is an Internet Protocol tunnel.

In another form, an apparatus is provided. The apparatus comprises: a network interface configured to obtain or provide network communications; and one or more processors coupled to the network interface, wherein the one or more processors are configured to: obtain from or provide to a provider edge node over a packet-switched network via an overlay, OAM data in an OAM channel of an active measurement protocol, wherein the OAM data relates to a networking issue; and responsive to the OAM data, automatically resolve the networking issue.

In another form, one or more non-transitory computer readable storage media are provided. The non-transitory computer readable storage media are encoded with instructions that, when executed by a processor of a first provider edge node, cause the processor to: obtain from or provide to a second provider edge node over a packet-switched network via an overlay, OAM data in an OAM channel of an active measurement protocol, wherein the OAM data relates to a networking issue; and responsive to the OAM data, automatically resolve the networking issue.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a first provider edge (PE) node connected to a packet switched network (PSN) of a hybrid network that includes a time-division multiplexing TDM) optical transport network connected to the PSN through gateway nodes, the method comprising:
    establishing, over the hybrid network, circuits that include a working circuit and a protect circuit to a second PE node that is connected to the TDM optical transport network;
    exchanging, with the second PE node over the circuits, Operations, Administration and Management/Maintenance (OAM) packets in an OAM channel of an active measurement protocol, each OAM packet having a sub-type, length, value (sub-TL V) that carries OAM data mapped from a TDM format of the TDM optical transport network to an active measurement protocol format for the PSN, wherein exchanging includes:
        receiving, from the second PE node for a loopback test, a first sub-TL V carrying a lock signal, mapped from the TDM format, to indicate the first sub-TLV does not carry client traffic; and
        receiving, from the second PE node, a second sub-TLV, mapped from the TDM format, which indicates a failure on the working circuit; and
    responsive to the second sub-TLV, automatically switching from the working circuit to the protect circuit.

2. The method of claim 1, wherein the second sub-TLV indicates one of a signal fail or a signal degraded.

3. The method of claim 1, wherein the sub-TLV indicates a backwards failure directed toward the second PE node on the working circuit in the TDM optical transport network.

4. The method of claim 1, wherein the first PE node and the second PE node are connected to a first customer edge node and a second customer edge node, respectively.

5. The method of claim 1, wherein the active measurement protocol involves a sender and a receiver, wherein the sender is configured to provide a measurement test packet to the receiver, and wherein the receiver is configured to, responsive to the measurement test packet, provide a measurement test reply packet to the sender.

6. The method of claim 1, wherein:
    exchanging includes exchanging the OAM packets over an overlay of the PSN that includes a pseudowire.

7. The method of claim 1, wherein:
    exchanging includes receiving the OAM packets over an overlay of the PSN that includes an Internet Protocol tunnel.

8. The method of claim 1, wherein:
    exchanging further includes exchanging a third sub-TLV that indicates a 1+1 path protection scheme.

9. The method of claim 1, wherein:
    exchanging further includes exchanging a third sub-TLV that indicates a wait to restore for automatically switching.

10. The method of claim 1, wherein the first PE node and the second PE node are connected to first customer equipment that generates a first payload type and second customer equipment that generates a second payload type, and the method further comprises, by the first PE node:
- receiving, from the second PE node, a third sub-TLV that indicates the second payload type; and
- upon determining that the second payload type and the second payload type are mismatched, sending a payload mismatch alarm to the second PE node.

11. An apparatus comprising:
a network interface of a first provider edge (PE) node and configured to communicate to a packet switched network (PSN) of a hybrid network that includes a time-division multiplexing (TDM) optical transport network connected to the PSN through gateway nodes; and
a processor of a first provider edge node coupled to the network interface, wherein the processor is configured to perform:
- establishing, over the hybrid network, circuits that include a working circuit and a protect circuit to a second PE node that is connected to the TDM optical transport network;
- exchanging, with the second PE node over the circuits, Operations, Administration and Management/Maintenance (OAM) packets in an OAM channel of an active measurement protocol, each OAM packet having a sub-type, length, value (sub-TL V) that carries OAM data mapped from a TDM format of the TDM optical transport network to an active measurement protocol format for the PSN, wherein exchanging includes:
  - receiving, from the second PE node for a loopback test, a first sub-TLV carrying a lock signal, mapped from the TDM format, to indicate the first sub-TL V does not carry client traffic; and
  - receiving, from the second PE node, a second sub-TLV, mapped from the TDM format, which indicates a failure on the working circuit; and
- responsive to the second sub-TLV, automatically switching from the working circuit to the protect circuit.

12. The apparatus of claim 11, wherein the second sub-TLV indicates one of a signal fail or a signal degraded.

13. The apparatus of claim 11, wherein the active measurement protocol involves a sender and a receiver, wherein the sender is configured to provide a measurement test packet to the receiver, and wherein the receiver is configured to, responsive to the measurement test packet, provide a measurement test reply packet to the sender.

14. The apparatus of claim 11, wherein the processor is configured to perform:
- exchanging by receiving the OAM packet over an overlay of the PSN that includes a pseudowire or an Internet Protocol tunnel.

15. The apparatus of claim 11, wherein:
the processor is further configured to perform exchanging, with the second PE node, a third sub-TLV that indicates a 1+1 path protection scheme.

16. The apparatus of claim 11, wherein:
the processor is further configured to perform exchanging, with the second PE node, a third sub-TLV that indicates a wait to restore for automatically switching.

17. One or more non-transitory computer readable storage media encoded with instructions that, when executed by a processor of a first provider edge (PE) node connected to a packet switched network (PSN) of a hybrid network that includes a time-division multiplexing (TDM) optical transport network connected to the PSN through gateway nodes, cause the processor to perform:
- establishing, over the hybrid network, circuits that include a working circuit and a protect circuit to a second PE node that is connected to the TDM optical transport network;
- exchanging, with the second PE node over the circuits, Operations, Administration and Management/Maintenance (OAM) packets in an OAM channel of an active measurement protocol, each OAM packet having a sub-type, length, value (sub-TL V) that carries OAM data mapped from a TDM format of the TDM optical transport network to an active measurement protocol format for the PSN, wherein exchanging includes:
  - receiving, from the second PE node for a loopback test, a first sub-TL V carrying a lock signal, mapped from the TDM format, to indicate the first sub-TLV does not carry client traffic; and
  - receiving, from the second PE node, a second sub-TLV, mapped from the TDM format, which indicates a failure on the working circuit; and
- responsive to the second sub-TLV, automatically switching from the working circuit to the protect circuit.

18. The one or more non-transitory computer readable storage media of claim 17, wherein the second sub-TL V indicates one of a signal fail or a signal degraded.

19. The one or more non-transitory computer readable storage media of claim 17, wherein the active measurement protocol involves a sender and a receiver, wherein the sender is configured to provide a measurement test packet to the receiver, and wherein the receiver is configured to, responsive to the measurement test packet, provide a measurement test reply packet to the sender.

20. The one or more non-transitory computer readable storage media of claim 17, further comprising instructions to cause the processor to perform exchanging, with the second PE, a third sub-TL V that indicates a 1+1 path protection scheme.

* * * * *